United States Patent [19]
Mauvernay et al.

[11] 3,728,457
[45] Apr. 17, 1973

[54] MEDICAMENT WITH AN ANTI-INFLAMMATORY AND ANTI-ULCEROUS ACTION

[75] Inventors: Roland Yves Mauvernay, Riom; Norbert Busch, Loubeyrat, both of France

[73] Assignee: Societe Anonyme dite: Centre Europeen de Recherches Mauvernay-Cerm, Riom, France

[22] Filed: Dec. 21, 1971

[21] Appl. No.: 210,586

[52] U.S. Cl. ..............................424/274
[51] Int. Cl. ..............................A61k 27/00
[58] Field of Search........................424/274

[56] References Cited

OTHER PUBLICATIONS

Chem. Abst. Vol. 72 (1970) 21607e.

*Primary Examiner*—Stanley J. Friedman
*Attorney*—Eric H. Waters et al.

[57] ABSTRACT

For anti-ulcerous and anti-inflammatory treatment, a medicament is administered to a patient consisting of N-[2-phenyl-2-isoamyloxy]-ethyl-pyrrolidine. The medicament can be administered parenterally in an amount of 10 to 50 mg/day or orally in an amount of 100 to 220 mg/day or rectally in an amount of 150 to 300 mg/day.

4 Claims, No Drawings

MEDICAMENT WITH AN ANTI-INFLAMMATORY AND ANTI-ULCEROUS ACTION

The present invention relates to a new medicament having both anti-ulcerous and anti-inflammatory properties and which may, therefore, be used as a eutrophic for the digestive mucous membrane.

This compound is N-(2-phenyl-2-isoamyloxy)-ethyl-pyrrolidine, of the formula:

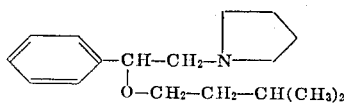

This compound is a known solid crystalline product which has been described as having pharmacologically useful properties, namely spasmolytic, vagolytic, anti-cholinergic and anti-depressive activities.

The present invention resides in the discovery that in certain forms and in certain doses this compound also possesses anti-ulcerous and anti-inflammatory properties which have not been described heretofore.

The compound may be prepared from styrene by a two-stage method which is described below by way of example.

a. Preparation of (2-phenyl, 2-isoamyloxy) ethyl bromide 1.6 M of terbutyl hypobromide are added dropwise with stirring to a mixture of 130 g styrene and 300 ml isoamyl alcohol while maintaining the temperature of the reaction mixture at about −10°C.

The reaction product is concentrated under vacuum (about 15 mm Hg) on a water-bath at a temperature of about 45°C. The residue is washed several times in water, dried over anhydrous sodium sulphate and finally distilled under vacuum to obtain a colorless liquid. ($E_1 = 98°-99°C$; $n_D^{20.4} = 1.5130$).

In this way there is obtained 135-140 g (2-phenyl, 2-isoamyloxy)ethyl bromide.

b. Preparation of final product in the form of its hydrochloride

The following mixture is refluxed with stirring for 10 hours:

117 g of (2-phenyl, 2-isoamyloxy) ethyl bromide
61,5 g of pyrrolidine
250 ml toluene The pyrrolidine hydrobromide formed is filtered off and the toluene then removed under vacuum. The residue is then taken up in 4N HCL. The resultant aqueous solution is washed with ether and made alkaline by the addition of a 50 percent solution of NaOH. The alkaline solution is extracted with ether and the ethereal phase dried over anhydrous sodium sulphate after which it is distilled under vacuum, after removing the solvent, to give 90g of a colorless oil having an amine odor. ($E_2 = 121°C$; $n_D^{21.6} = 1.4978$).

The hydrochloride is prepared in a conventional manner by dissolving the amine in anhydrous ether and adding the necessary amount of gaseous, dry hydrogen chloride dissolved in absolute alcohol.

The resultant product is a white crystalline powder melting at 150°C, which is very soluble in water and alcohol, and virtually insoluble in ether and ethyl acetate. The product has the following analysis:

N Calculated = 4.70% Cl⁻ Calculated = 11.90%
N Found = 4.65% Cl⁻ Found = 11.90%

The anti-inflammatory and anti-ulcerous activities of this compound have been demonstrated by the following pharmacological tests.

I — Anti-inflammatory action

This was demonstrated by the following studies:

1. In vitro (inhibition of the action of biological inflammation agents)
2. In vivo, on rats

1. IN VITRO STUDY

The activity of the compound according to the invention in inhibiting contraction of the isolated guinea pig ileum provoked by biological inflammation agents is evaluated by its ED 50 (the dose required to give an inhibition of 50 percent of the effect under consideration).

| INFLAMMATORY AGENT | | INHIBITING AGENT | |
|---|---|---|---|
| Type | Concentration | ED50 of product of the invention | ED50 of reference product |
| Serotonine | $5 \times 10^{-5}$ g/l | $1.7 \times 10^{-4}$ g/l | Methylsergide: $5,10^{-4}$ g/l |
| Bradykinine | " | $3.6 \times 10^{-3}$ g/l | Naftidrofuryl: $4.1 \cdot 10^{-3}$ g/l |
| Histamine | " | $2.4 \times 10^{-4}$ g/l | Antazolin: $1.5,10^{-5}$ g/l |

The product according to the invention thus shows a marked all-round inhibiting effect on all the inflammation agents tested.

2. IN VIVO STUDY (180 g rats — batches of 10 animals)

Three types of activity were investigated:
i. The anti-acute oedema (carraghenin oedema), activity of the compound
ii. The effect of the compound on the secondary inflammation tissue (granulomata)
iii. The activity of the compound on chronic disseminated inflammatory disease (FREUND Adjuvant arthritis).

| Tests | Product of the invention | Acetyl salicylic acid | Flufenamic acid 50mg/kg (P.O.) |
|---|---|---|---|
| Carraghenin oedemas (planimetric value) (III) | 200 | 166 | 200 |
| Granulomata on cotton wool pellets (% of inhibition) | 17% | inactive | 20% |
| FREUND Adjuvant arthritis (I) | 30% | 0% | 50% |
| (% age inhibition on the 21st day) (II) | 95% | 50% | 50% |

I. Inhibition of primary arthritis (estimated by measuring the volume of a paw which has been subjected to injection).
II. Inhibition of secondary arthritis (estimated by measuring the volume of a paw contra-lateral to that measured in I.
III. Planimetric value=sum of the percentage inhibition calculated every hour for 7 hours.

Conclusion

It is clear from the above tests that the product according to the invention is, in general, greatly superior to acetyl-salicylic acid and equivalent to flufenamic acid (slightly inferior in the granulomata and primary arthritis tests, but greatly superior in the secondary arthritis test).

II — Anti-ulcerous activity

This was investigated on several types of experimental ulceration in rats, namely:

1. central-origin ulcers (restraint ulcers), and
2. peripheral-origin ulcers (phenylbutazone, ligature of the pylorus, reserpine).

1. LOCAL-ORIGIN ULCERS

The products are administered in a dose of 50 mg/kg P.O. (except for Atropine which is administered in a dose 10 mg/kg) to batches of 10 rats; the study lasts for 18 hours.

The techniques used for creating gastric ulcers are conventional, namely:

a. ligature of the pylorus according to the SHAY technique.
b. oral administration of phenylbutazone in doze of 200 mg/kg.
c. sub-cutaneous injection of reserpine in a doze of 5 mg/kg.

Results

The following table indicates the average values obtained with different products, these values having been established in accordance with a scale which takes into consideration the extent and gravity of the lesions.

| Product | Technique Ligature of the pylorus | Reserpine | Phenylbutazone |
|---|---|---|---|
| Product of the invention | 10 | 6.4 | 22.3 |
| Sulpiride | 22 | 24.4 | 40.2 |
| Atropine | 8 | 10 | 18 |
| Controls— untreated | 27 | 21,4 | 41,6 |

In all the tests as a whole, therefore, the product of the invention shows a protective activity in respect of local-origin ulcers. This activity is greatly superior to that of sulpiride and slightly inferior to that of atropine.

2. CENTRAL-ORIGIN ULCERS

Technique: Restraint of WISTAR rats (180g) according to the BONFILS method.
Period of restraint: 24 hours
Batch of 20 animals

| Products | % animals with ulcers | Observations |
|---|---|---|
| Controls | 93.3% | Mucous membrane very congestive; vascular system apparent, with haemorraghic suffusions |
| Sulpiride (50 mg.kg P.O.) | 75% | Little amelioration in the aspect of the mucous membrane |
| Atropine (10 mg/kg P.O.) | 20% | Mucous membrane still congestive, with marked vasodilatation |
| Product according to the invention (50 mg/kg P.O.) | 20% | Only 3 animals in 10 have a slightly congestive mucous membrane; in all other animals, the membrane appears absolutely normal. |

Conclusion

The product according to the invention has a very original effect on the ulceration caused by psychic stress. It is the only product to clearly ameliorate the congestive aspect and the vascularization of the mucous membrane.

As a result, the compound of the present invention appears to be especially suited for the treatment of all attacks on the digestive mucous membrane, such as gastric ulcers, duodenal ulcers, gastritis, duodenitis, jejunitis, ileitis, rectitis, colitis, cholecystitis, etc. To this end, the product according to the invention can be administered:

parenterally at a dosage of 10 to 50 mg/day
orally at a dosage of 100 to 200 mg/day
rectally at a dosage of 150 to 300 mg/day Thus the product of the invention may be formulated as a solution for injection in sterile water; as a syrup, linctus tablet or dragee for oral administration, or as a suppository for rectal administration.

The following examples of pharmaceutical composites in accordance with the invention are given by way of illustration only.

Example 1 — Injectable ampoules

| | |
|---|---|
| Product according to the invention | 25 mg |
| Sodium chloride | 12,8 mg |
| Distilled water ad | 2 ml |

Dissolve the product of the invention and the sodium chloride in the distilled water. Filter. Divide into 2 ml ampoules. Sterilize for 30 minutes at 110°C.

Example 2 — Syrup

Formula for 100 ml

| | |
|---|---|
| Product of the invention | 200 mg |
| Sugar | 81 g |
| Methyl parahydroxybenzoate | 0,5 g |
| Aromatics | 5 ml |
| Colorant | 2 mg |
| Drinking water ad | 100 ml |

Dissolve the product of the invention and the sugar in a sufficient amount of water.
Prepare a solution of the parahydroxybenzoate in water with heating separately and add it to the sugar syrup. Complete with water to the disered volume.
Filter on a cellulose disc.

Example 3 — Aerosol

| | |
|---|---|
| Product of the invention | 87,5 mg |
| Absolute ethyl alcohol | 1 ml |
| Freon 12 | 6 ml |

Dissolve the product according to the invention in the absolute ethyl alcohol before introducing the Freon 12.

Example 4 — Compressed as dragees a. Core

| | |
|---|---|
| Product of the invention | 50 mg |
| Dicalcium phosphate | 60 mg |
| Colloidal silica | 50 mg |
| Corn starch | 30 mg |
| Polyvidone | 4 mg |

| | |
|---|---|
| magnesium stearate | 4 mg |
| Talc | 2 mg |
| Total: | 200 mg |

Mix the powders (except the talc) the magnesium stearate and one-third of the starch.
Steep this mixture with ethyl alcohol at 30°.
Granulate on a No. 30 AFNOR grid.
Dry this granulate for 30 minutes at 40° in air bed.
Add the talc, the magnesium stearate and one-third of the starch.
Compress to give 200 mg cores.

b. Coating

| | |
|---|---|
| Gelatin | 3 g |
| Titanium oxide | 2 g |
| Sugar | 58 g |
| Water | 37 ml |

Introduce the cores into a sugar-coating centrifuge.
Pulverize this syrup onto the cores in successive layers with intermediate hot-air drying until a 350 mg dragee is obtained.

Example 5 — Suppositories

| | | |
|---|---|---|
| Product of the invention | | 100 mg |
| Semi-synthetic glycerides | | 1900 mg |
| | Total: | 2000 mg |

Introduce the product into the excipient which has been melted beforehand.
Homogenize
Pour into 2g moulds.

We claim:

1. For anti-ulcerous and anti-inflammatory treatment, a method comprising administering a medicament to a patient requiring such treatment, said medicament being administered in a pharmaceutically effective dose and consisting of N-[2-phenyl-2-isoamyloxy]-ethyl-pyrrolidine.

2. A method as claimed in claim 1 wherein the medicament is administered parenterally at a rate of 10 to 50 mg/day.

3. A method as claimed in claim 1 wherein the medicament is administered orally at a rate of 110 to 220 mg/day.

4. A method as claimed in claim 1 wherein the medicament is administered rectally at a rate of 150 to 300 mg/day.

* * * * *